(12) United States Patent
Kojima et al.

(10) Patent No.: US 10,825,593 B2
(45) Date of Patent: Nov. 3, 2020

(54) NI—ZN—CU FERRITE PARTICLE, RESIN COMPOSITION, AND RESIN MOLDING (71) Applicant: POWDERTECH CO., LTD., Chiba (JP)

(72) Inventors: Takashi Kojima, Chiba (JP); Kazutaka Ishii, Chiba (JP); Takao Sugiura, Chiba (JP); Tetsuya Igarashi, Chiba (JP); Koji Aga, Chiba (JP)

(73) Assignee: POWDERTECH CO., LTD., Chiba (JP)

( * ) Notice: Subject to any disclaimer, the term of this patent is extended or adjusted under 35 U.S.C. 154(b) by 0 days.

(21) Appl. No.: 16/336,644

(22) PCT Filed: Jun. 7, 2017

(86) PCT No.: PCT/JP2017/021136
§ 371 (c)(1),
(2) Date: Mar. 26, 2019

(87) PCT Pub. No.: WO2018/061327
PCT Pub. Date: Apr. 5, 2018

(65) Prior Publication Data
US 2019/0341177 A1    Nov. 7, 2019

(30) Foreign Application Priority Data
Sep. 30, 2016 (JP) .................................. 2016-194996

(51) Int. Cl.
*H01F 1/375* (2006.01)
*C22C 38/08* (2006.01)
(Continued)

(52) U.S. Cl.
CPC ............. *H01F 1/375* (2013.01); *C22C 38/08* (2013.01); *C22C 38/16* (2013.01); *G03G 9/107* (2013.01); *C22C 2202/02* (2013.01)

(58) Field of Classification Search
CPC ............. H01F 1/375; H01F 1/344; H01F 1/36
See application file for complete search history.

(56) References Cited

U.S. PATENT DOCUMENTS

| 5,736,111 A | 4/1998 | Saegusa |
| 6,379,579 B1 * | 4/2002 | Harada ................... B32B 18/00 252/62.6 |

(Continued)

FOREIGN PATENT DOCUMENTS

| EP | 1262450 | 12/2002 |
| EP | 2368864 A1 | 9/2011 |

(Continued)

OTHER PUBLICATIONS

Translation of JP 2001-10820, Jan. 16, 2001.*

(Continued)

*Primary Examiner* — C Melissa Koslow
(74) *Attorney, Agent, or Firm* — Greenblum & Bernstein, P.L.C.

(57) ABSTRACT

An object of the present invention is to provide ferrite particles having high saturation magnetisation and electrical resistivity, excellent in dispersibility in a resin, a solvent, or a resin composition; a rein composition containing the ferrite particles; and a resin molding composed of the resin composition. A Ni-Zn-Cu ferrite particle is in a single crystalline body having an average particle diameter of 1 to 2000 nm, has a polyhedral particle shape, and comprises 5 to 10 wt % of Ni, 15 to 30 wt % of Zn, 1 to 5 wt % of Cu, and 25 to 50 wt % of Fe.

14 Claims, 4 Drawing Sheets

(51) Int. Cl.
*C22C 38/16* (2006.01)
*G03G 9/107* (2006.01)

(56) References Cited

U.S. PATENT DOCUMENTS

| | | |
|---|---|---|
| 7,238,298 B2 | 7/2007 | Aoki et al. |
| 2008/0206664 A1 | 8/2008 | Shinmura et al. |
| 2014/0210131 A1 | 7/2014 | Yamamoto et al. |
| 2017/0301443 A1 | 10/2017 | Aga et al. |

FOREIGN PATENT DOCUMENTS

| | | | |
|---|---|---|---|
| JP | H09-048618 A | | 2/1997 |
| JP | 2001-10820 | * | 1/2001 |
| JP | 2004-315344 A | | 11/2004 |
| JP | 2008-216339 A | | 9/2008 |
| JP | 2014-074133 A | | 4/2014 |
| WO | WO 2016/043051 A | | 3/2016 |

OTHER PUBLICATIONS

International Search Report in International Application No. PCT/JP2017/021136, dated Aug. 15, 2017, together with an English-language translation.

International Preliminary Report on Patentability and Written Opinion of the International Searching Authority in International Application No. PCT/JP2017/021136, dated Apr. 11, 2019, together with an English-language translation.

* cited by examiner

NI—ZN—CU FERRITE PARTICLE, RESIN COMPOSITION, AND RESIN MOLDING

TECHNICAL FIELD

The present invention relates to a Ni-Zn-Cu ferrite particle, a resin composition containing the ferrite particle, and a resin molding composed of the resin composition.

BACKGROUND ART

Conventionally, as a flexible printed wiring material for use in wiring and cables to electronic equipment, a resin film containing filler such as silicon oxide, titanium oxide, and aluminum oxide having an average particle diameter of 1 to 10 μm has been proposed (for example, refer to Patent Literature 1).

Such a resin film is formed, for example, by dispersing filler into a resin composition containing a resin and an aqueous solvent or an organic solvent-based solvent, then applying the filler-containing resin composition to a substrate, and evaporating the solvent so as to cure the resin. A metal layer such as a copper layer is then laminated on the resin film, so that a metal wiring is formed. When the metal layer is laminated, a resin film functioning as a base is required, while after lamination of the metal layer, an unnecessary resin film generated corresponding to the shape of the metal wiring needs to be removed.

Accordingly, in order to simply and efficiently remove the resin film, it is conceivable that, with use of ferrite particles as filler instead of silicon oxide or the like, the resin film is adsorbed to remove by applying a magnetic field to the resin film.

For example, it is conceivable to use Mn—Mg ferrite particles having an average particle diameter of 20 to 50 μm and a magnetisation (saturation magnetisation) of about 60 $Am^2/kg$ disclosed in Patent Literature 2 as the ferrite particles. Alternatively, it is conceivable to use, for example, an Mn—Mg ferrite having a spherical particle shape with an average particle diameter of 1 to 2000 nm disclosed in Patent Literature 3 as the ferrite particles.

In use of a resin film containing ferrite particles as a flexible printed wiring material, the ferrite particles are also required to have a high resistivity such that durability is secured by suppressing generation of current leakage.

CITATION LIST

Patent Literature

[Patent Literature 1]
  Japanese Patent Laid-Open No. 2014-074133
[Patent Literature 2]
  Japanese Patent Laid-Open No. 2008-216339
[Patent Literature 3]
  International Publication No. WO 2016/043051

SUMMARY OF INVENTION

Technical Problem

Use of the ferrite particles disclosed in Patent Literatures 2 and 3 in a resin molding such as a resin film, however, causes the problems that the ferrite particles have insufficient dispersibility in a resin, a solvent or a resin composition and that irregularities are produced on the surface of a resin molding by the ferrite particles. Another problem with the ferrite particles disclosed in Patent Literatures 2 and 3 is that a high resistivity cannot be obtained when a high voltage is applied.

An object of the present invention is to provide a ferrite particle having high saturation magnetisation and electrical resistivity, excellent in dispersibility in a resin, a solvent, or a resin composition; a rein composition containing the ferrite particle; and a resin molding composed of the resin composition.

Solution to Problem

The Ni-Zn-Cu ferrite particle of the present invention is in a single crystalline body having an average particle diameter of 1 to 2000 nm, has a polyhedral particle shape, and contains 5 to 10 wt % of Ni, 15 to 30 wt % of Zn, 1 to 5 wt % of Cu, and 25 to 50 wt % of Fe.

Preferably, in the Ni-Zn-Cu ferrite particle, the Zn is segregated in the surface thereof.

Preferably, in the Ni-Zn-Cu ferrite particle, the Cu is segregated in the surface thereof.

The resin composition of the present invention comprises the Ni-Zn-Cu ferrite particle as filler.

The resin molding of the present invention comprises the resin composition.

Advantageous Effects of Invention

The Ni-Zn-Cu ferrite particles of the present invention contain 5 to 10 wt % of Ni, 15 to 30 wt % of Zn, 1 to 5 wt % of Cu, and 25 to 50 wt % of Fe, achieving both of a moderate saturation magnetisation and a high electrical resistivity, and, in addition thereto, a low residual magnetisation. Also, the Ni-Zn-Cu ferrite particles of the present invention have a small average particle diameter of 1 to 2000 nm and a low residual magnetisation, so that aggregation of the particles can be reduced, resulting in excellent dispersibility in a resin, a solvent, or a resin composition. Also, since the Ni-Zn-Cu ferrite particles of the present invention contain Zn, a polyhedral particle shape can be obtained. Also, even though having a low absolute value of magnetic permeability, the Ni-Zn-Cu ferrite particles of the present invention achieve not only excellent frequency properties but also an approximately constant magnetic permeability in a wide band range from low frequency to high frequency due to having the extremely small particle diameter and being in a single crystalline body. Furthermore, the Ni-Zn-Cu ferrite particles of the present invention suitably used as filler in a resin molding allow a smooth surface to be obtained without aggregation of the ferrite particles.

DESCRIPTION OF EMBODIMENT

The embodiment of the present invention is described in the following.

<Ni-Zn—Cu Ferrite Particle of the Present Invention>

The Ni-Zn-Cu ferrite particles of the present invention (hereinafter referred to as "ferrite particles") can achieve both of a moderate saturation magnetisation and a high electrical resistivity, and, in addition thereto, a low residual magnetisation, due to having a specific ferrite composition as described below. Also, the ferrite particles of the present invention can achieve excellent dispersibility in a resin, a solvent, or a resin composition, due to having an average particle diameter in a specific range and a low residual magnetisation. Also, the Ni-Zn-Cu ferrite particles of the present invention can have a polyhedral particle shape, due to containing Zn. Also, even though having a low absolute value of magnetic permeability, the ferrite particles of the present invention can achieve not only excellent frequency properties but also an approximately constant magnetic permeability in a wide band range from low frequency to high frequency, even though the maximum magnetic permeability due to resonance of the magnetic domain can be seen, due to being in a single crystalline body, which allows the magnetic domain produced by an alternating magnetic field to pass through no grain boundary planes.

(Average Particle Diameter)

The ferrite particles of the present invention have an average particle diameter of 1 to 2000 nm. With an average particle diameter of less than 1 nm, the particles aggregate even when subjected to surface treatment, so that excellent dispersibility in a resin, a solvent, or a resin composition cannot be obtained. Meanwhile, with an average particle diameter of more than 2000 nm, although the dispersibility can be secured, the presence of the ferrite particles in a ferrite particle-containing molding may cause irregularities in the surface of the molding in some cases. In the case of a molding as a flexible printed wiring material for use in wiring and cables to electronic equipment, the metal wiring to be formed thereon may be damaged by the irregularities. The average particle diameter of the ferrite particles is preferably 1 to 800 nm, more preferably 1 to 300 nm.

(Crystal Form)

The ferrite particles of the present invention are in a single crystalline body. In the case of ferrite particles in a polycrystalline body, crystal grain boundaries are formed in a microstructure within a particle in the crystal growth process during firing. Consequently, the magnetic domain produced by an alternating magnetic field is prevented from passing through the grain boundaries by the crystal grain boundaries, resulting in poor frequency properties in some cases. In contrast, in the case of a ferrite particles in a single crystalline body, the magnetic domain produced by an alternating magnetic field passes through no grain boundaries, so that not only excellent frequency properties but also an approximately constant magnetic permeability in a wide band range from low frequency to high frequency, even though the maximum magnetic permeability due to resonance of the magnetic domain can be seen, can be obtained.

(Particle Shape)

The ferrite particles of the present invention can be in a polyhedral shape due to containing Zn. It is conceivable that due to the high saturation vapor pressure of Zn, Zn is released from the internal part of a ferrite particle during growth of the particle, functioning as a flux to make a single crystal, so that the grown particle is formed into a polyhedral shape as reflection of the crystal structure.

(Composition)

The ferrite particles of the present invention are Ni-Zn-Cu ferrite particles containing 5 to 10 wt % of Ni, 15 to 30 wt % of Zn, 1 to 5 wt % of Cu, and 25 to 50 wt % of Fe. Due to being a Ni-Zn-Cu ferrite particles having the composition described above, the ferrite particles of the present invention can achieve not only both of a high saturation magnetisation and a low residual magnetisation, but also a high electrical resistivity in the range from low applied voltage to high applied voltage in a stable state as described later.

With a Ni content of less than 5 wt %, the electrical resistivity decreases, which is not preferred. Meanwhile, with a Ni-content of more than 10 wt %, the Zn content relatively decreases excessively, so that the saturation magnetisation cannot be enhanced.

With a Zn content of less than 15 wt %, a sufficient amount of Zn cannot be segregated in the surface of a ferrite particle, so that the resistivity decreases for low applied voltage. Furthermore, a polyhedral shape may be hardly formed. Meanwhile, with a Zn content of more than 30 wt %, the saturation magnetisation cannot be enhanced due to a relatively reduced Ni content.

With a Cu content of less than 1 wt %, a sufficient amount of Cu cannot be segregated in the surface of a ferrite particle, so that the resistivity decreases for low applied voltage. Meanwhile, with a Cu content of more than 5 wt %, the saturation magnetisation cannot be enhanced due to a relatively reduced Ni content.

With an Fe content of less than 25 wt %, no ferrite component is formed due to the small absolute amount of Fe, so that the saturation magnetisation cannot be enhanced. Meanwhile, with an Fe content of more than 45 wt %, the residual magnetisation of ferrite particles increases to cause aggregation of ferrite particles easily, so that it may be difficult to disperse the ferrite particles uniformly in a resin, a solvent, or a resin composition in some cases.

Preferably, the ferrite particle of the present invention includes Zn segregated in the surface thereof. Although Zn is present in the internal part of the ferrite particle, Zn segregated in the surface allows the electrical resistivity described below to further increase.

Preferably, the ferrite particle of the present invention includes Cu segregated in the surface thereof. Although Cu is present in the internal part of the ferrite particle, Cu segregated in the surface allows the electrical resistivity to further increase. The surface segregation of Cu may occur in the region where the surface segregation of Zn occurs or may occur in the region where no surface segregation of Zn occurs.

(Saturation Magnetisation)

Due to being Ni-Zn-Cu ferrite particles having the composition described above, the ferrite particles of the present invention can achieve a moderate saturation magnetisation. A resin molding made from the ferrite particles can be, therefore, adsorbed by application of a magnetic field. Preferably, the ferrite particles have a saturation magnetisation in the range from 20 to 60 $Am^2/kg$. With a saturation magnetisation of less than 20 $Am^2/kg$, it may be difficult to adsorb the resin molding by application of a magnetic field in some cases. Meanwhile, it is difficult for Ni-Zn-Cu ferrite particles having the average particle diameter described above to achieve a saturation magnetisation of more than 60 $Am^2/kg$.

(Residual Magnetisation)

Due to being Ni-Zn-Cu ferrite particles having the composition described above, the ferrite particles of the present invention can achieve a low residual magnetisation. The ferrite particles can therefore achieve excellent dispersibility in a resin, a solvent, or a resin composition. Preferably, the ferrite particles have a residual magnetisation of 5 $Am^2/kg$ or less. With a residual magnetisation of more than 5

Am²/kg, aggregation of the ferrite particles occurs easily, so that it may be difficult to disperse the ferrite resin uniformly in a resin, a solvent, or a resin composition in some cases.

(Powder Resistivity)

Due to being Ni-Zn-Cu ferrite particles having the composition described above, the ferrite particles of the present invention can obtain a powder resistivity (electrical resistivity). A printed wiring material made of resin molding containing the ferrite particles can, therefore, prevent the generation of electrical current leakage, and secure the durability. As the powder resistivity, the volume resistivity is preferably $1 \times 10^7$ $\Omega \cdot$cm or more.

Ferrite particles having a low resistivity at low voltage application allow the electric current to flow easily on the surface of the particles, so that a resin molding containing the ferrite particles as filler allows the electric current to flow easily at a local pin hole and a region with a thin film thickness. As a result, use of a resin film containing the ferrite particles as flexible printed wiring material causes a problem of easy occurrence of electrical current leakage to components in the periphery of the printed wiring material. Meanwhile, a high resistivity at high voltage application allows a resin molding containing the ferrite particles to be susceptible to the electric current flowing through the whole of a ferrite particle, so that an overcurrent in the whole of the resin molding containing the ferrite particles occurs, resulting in a problem that the resin molding is easily deformed. From the above, more preferably, as the powder resistivity of the ferrite particles, the volume resistivity is $1 \times 10^7$ $\Omega \cdot$cm or more for an applied voltage in the range from 200 to 1000 V.

(BET Specific Surface Area)

Preferably, the ferrite particle of the present invention has a BET specific area of 1 to 30 m²/g. With a BET specific surface area of less than 1 m²/g, the affinity between the particle surface and the resin composition is insufficient in a resin composition containing the ferrite particles, so that the resin composition present in the particle surface may locally swell in some cases. As a result, irregularities may be formed on the surface of a molding made from the resin composition in some cases.

<Method for Manufacturing Ferrite Particle>

The method for manufacturing the ferrite particle described above is described as follows.

The ferrite particle described above can be manufactured by thermally spraying the raw material of ferrite containing Fe, Ni, Zn and Cu in the air for ferritization so as to be successively quenched and solidified, and then by collecting particles having a particle diameter in a specified range only.

The method for preparing the raw material of ferrite is not particularly limited, and a conventionally known method including a dry method and a wet method may be employed.

One example of the method for preparing the raw material of ferrite (granulated product) is as follows. Appropriate amounts of raw material Fe, raw material Ni, raw material Zn, and raw material Cu each are weighed out so as to give a desired ferrite composition. Water is then added to the raw materials, and the mixture is pulverized to prepare a slurry. The pulverized slurry is granulated by a spray dryer, so that a granulated product having a desired particle diameter is prepared through classification. Preferably, the particle diameter of the granulated product is about 0.5 to 10 μm, considering the particle diameter of the ferrite particles to be obtained. In another example of the method, raw materials of ferrite having a prepared composition are mixed and subjected to dry pulverization, so that each of the raw materials are pulverized and dispersed. The mixture is granulated by a granulator, so that a granulated product having a desired particle diameter is prepared through classification.

The granulated product thus prepared is thermally sprayed in the air for ferritization. In thermal spraying, a mixed gas of a combustible gas and oxygen can be used for the combustible gas flame, with a volume ratio between the combustion gas and oxygen of 1:3.5 to 6.0. With a ratio of oxygen to a combustion gas in the combustible gas flame of less than 3.5, insufficient melting may occur in some cases, while with a ratio of oxygen to a combustion gas of more than 6.0, ferritization hardly occurs. For example, the ratio of 35 to 60 Nm³/hr of oxygen to 10 Nm³/hr of combustion gas may be employed.

Examples of the combustion gas for use in the thermal spraying include propane gas, propylene gas, and acetylene gas, and, in particular, propane gas is suitably used. In order to transport the granulated product during burning of the combustible gas, nitrogen, oxygen or air may be used as a gas for transporting the granulated product. Preferably, the granulated product is transported at a linear velocity of 20 to 60 m/sec. The thermal spraying is performed at a temperature of, preferably 1000 to 3500° C., more preferably 2000 to 3500° C.

Subsequently, the ferrite particles ferritized by thermal spray are rapidly cooled and solidified by conveying the ferrite particles in a state of riding on an air flow due to air supply in the air, and then the ferrite particles having average particle sizes of 1 to 2000 nm were captured and collected. The aforementioned capture can be performed, for example, by a method in which rapidly cooled and solidified ferrite particles are conveyed in a state of riding on the air flow due to air supply, ferrite particles having particle sizes exceeding the aforementioned range are allowed to drop in the midway of the air flow path, and the ferrite particles having the particle sizes falling within the aforementioned range are captured with a filter equipped on the downstream side of the air flow.

Subsequently, the collected ferrite particles are classified, if required, to be regulated to desired particle sizes. As the classification method, existing pneumatic classification, a mesh filtration method, a settling method and the like can be used. It is to be noted that by using a cyclone or the like, the particles having large particle sizes can also be removed.

Preferably, the obtained ferrite particles undergo a surface treatment with a coupling agent. Through the surface treatment with a coupling agent, the dispersibility of the ferrite particles in a resin, a solvent, or a resin composition can be further improved. Examples of the coupling agent for use include various silane coupling agents, a titanate coupling agent, and an aluminate coupling agent. More preferably, decyltrimethoxysilane and n-octyltriethoxysilane may be used. Preferably, the amount in terms of silane coupling agent for the surface treatment is 0.05 to 8 wt % relative to ferrite particles, depending on the BET specific surface area of the ferrite particles.

<Applications of Ferrite Particles of the Present Invention>

The ferrite particles of the present invention may be used, for example, in a resin molding for use as a flexible printed wiring material. First, the ferrite particles are added to a resin composition containing a resin and an aqueous solvent or an organic solvent-based solvent. The mixture is stirred and mixed, so that the ferrite particles are dispersed in the resin composition. Subsequently, the filler-containing resin composition is applied to a substrate, and the solvent is evaporated and the resin is cured. A resin molding is thus manufactured.

The ferrite particles described above function as magnetic filler in the resin molding. Since the ferrite particles have a high saturation magnetisation and a low residual magnetisation, an unnecessary resin molding occurring in forming a metal wiring with a metal layer laminated on the resin molding can be adsorbed to remove by application of a magnetic field.

The ferrite particles described above can obtain a high electrical resistivity in the range from low applied voltage to high applied voltage in a stable state, so that in use of a resin molding containing the ferrite particles as a flexible printed wiring material, the durability can be secured through suppression of the generation of electrical current leakage.

Also, the ferrite particles of the present invention can be used in various applications, not limited to a resin molding for use as flexible printed wiring material. The ferrite particles may be used as filler, particularly as magnetic filler, or may be used as raw material of a molding. In use of the ferrite particles as raw material for molding, molding, granulation, coating, and the like may be performed, and firing may be performed. As described above, the ferrite particles are excellent in frequency properties and capable of achieving an approximately constant magnetic permeability in a frequency band of 1 MHz to 2 GHz, so that the ferrite particles can be used also as a material for shielding electromagnetic waves.

The present invention is specifically described with reference to Examples as follows.

EXAMPLES

1. Manufacturing of Ferrite Particle

Example 1

Iron oxide ($Fe_2O_3$), nickel oxide (NiO), zinc oxide (ZnO), and copper oxide (CuO) were weighed at a molar ratio of 44.9:16.7:33.4:5.1, and mixed. Water was added to the mixture, which was then pulverized to make a slurry having a solid content of 50 wt %. The slurry was granulated by a spray dryer and classified to make a granulated product having an average particle diameter of 5 μm.

Next, the obtained granulated product was ferritized by thermally spraying the obtained granulated product under the condition of a linear velocity of approximately 40 m/sec into a combustible gas combustion flame of propane:oxygen=10 $Nm^3$/hr:35 $Nm^3$/hr, and subsequently the ferritized product was conveyed in a state of riding on the air flow due to air supply, and thus rapidly cooled in the air. In this case, the granulated product was thermally sprayed while the granulated product was being allowed to continuously flow, and accordingly, the particles after thermal spraying-rapid cooling were not bonded to each other and were mutually independent. Subsequently, the cooled particles were captured with a filter equipped on the downstream side of the air flow. In this case, the particles having large particle sizes dropped in the midway of the air flow path, and were not captured with the filter. Next, the captured particles were classified to remove the coarse powder having particle sizes exceeding 2000 nm, and thus ferrite particles were obtained. In other words, the obtained ferrite particles had the maximum particle size of 2000 nm or less.

Example 2

In the present Example, ferrite particles were manufactured in the same manner as in Example 1, except that the molar ratio among iron oxide, nickel oxide, zinc oxide and copper oxide was set at 45.6:12.3:35.4:6.8.

Comparative Example 1

In the present Comparative Example, a granulated product was obtained in exactly the same manner as in Example 1, except that iron oxide, nickel oxide, zinc oxide and copper oxide were mixed at a molar ratio of 43.22:6.17:43.69:6.64. Subsequently, ferrite particles were manufactured in exactly the same manner as in Example 1, except that the granulated product obtained in the present Comparative Example was used.

Comparative Example 2

In the present Comparative Example, a granulated product was obtained in exactly the same manner as in Example 1, except that iron oxide, nickel oxide, zinc oxide and copper oxide were mixed at a molar ratio of 70.0:12.0:15.0:3.0. Subsequently, the obtained granulated product was placed in a saggar, and fired in an electric furnace at 1200° C., for 4 hours in a nitrogen atmosphere having an oxygen concentration of 0% by volume to ferritize the granulated product, and thus a fired product being an agglomerate adapted to the shape of the saggar was obtained. The obtained fired product was rapidly cooled in the air, the cooled fired product was ground in a mortar to be pulverized, and thus ferrite particles were manufactured.

Comparative Example 3

In the present Comparative Example, a granulated product was obtained in exactly the same manner as in Example 1, except that iron oxide, nickel oxide, zinc oxide and copper oxide were mixed at a molar ratio of 44.9:16.7:38.0:5.1. Subsequently, ferrite particles were manufactured in the same manner as in Example 1, except that after thermal spraying of the granulated product obtained in the present Comparative Example in an exactly the same manner as in Example 1, the cooled particles were directly captured (all the particles were captured) without allowing the cooled particles to ride on the air flow.

Comparative Example 4

In the present Comparative Example, a granulated product was obtained in exactly the same manner as in Example 1, except that iron oxide and manganese dioxide ($MnO_2$) were mixed at a molar ratio of 80:20. Subsequently, ferrite particles were manufactured in exactly the same manner as in Example 1, except that the granulated product obtained in the present Comparative Example was used.

Comparative Example 5

In the present Comparative Example, a granulated product was obtained in exactly the same manner as in Example 1, except that iron oxide, manganese dioxide, magnesium oxide (MgO) and strontium oxide (SrO) were mixed at a molar ratio of 50:40:10:1.25. Subsequently, ferrite particles were manufactured in exactly the same manner as in Example 1, except that the granulated product obtained in the present Comparative Example was used.

TABLE 1

|  | Initial molar ratio | | | | | | | Manufacturing method | |
|---|---|---|---|---|---|---|---|---|---|
|  | Fe$_2$O$_3$ | NiO | ZnO | CuO | MnO$_2$ | MgO | SrO | | |
| Example 1 | 44.9 | 16.7 | 33.4 | 5.1 | 0 | 0 | 0 | Thermal spraying | Capture with filter |
| Example 2 | 45.6 | 12.3 | 35.4 | 6.8 | 0 | 0 | 0 | Thermal spraying | Capture with filter |
| Comparative Example 1 | 43.2 | 6.2 | 43.7 | 6.6 | 0 | 0 | 0 | Thermal spraying | Capture with filter |
| Comparative Example 2 | 70.0 | 12.0 | 15.0 | 3.0 | 0 | 0 | 0 | Electric furnace | Pulverization |
| Comparative Example 3 | 44.9 | 16.7 | 38.0 | 5.1 | 0 | 0 | 0 | Thermal spraying | Direct capture |
| Comparative Example 4 | 80 | 0 | 0 | 0 | 20 | 0 | 0 | Thermal spraying | Capture with filter |
| Comparative Example 5 | 50 | 0 | 0 | 0 | 40 | 10 | 1.25 | Thermal spraying | Capture with filter |

2. Preparation of Ink for Forming Coating Film and Manufacturing of Resin Molding For the purpose of making a resin molding that contains the ferrite particles obtained in any of Examples 1 and 2 and Comparative Examples 1 to 5 as filler, first, inks for forming coating films as a resin composition that contains the ferrite particles was prepared as described below.

Any of the ferrite particles in Examples 1 and 2 and Comparative Examples 1 to 5 were mixed with an epoxy resin to prepare the ink for forming a coating film. The preparation of ink for forming a coating film was performed by mixing 65 parts by weight of ferrite particles, 12 parts by weight of epoxy resin in terms of solid resin content, and 48 parts by weight of toluene, and dispersing the mixture by a homogenizer.

Subsequently, a coating film made from the obtained ink for forming a coating film was formed on a PET film or a glass plate as substrate by a Baker applicator (SA-201, manufactured by Tester Sangyo Co., Ltd.). The coating film had a thickness of 4 mil (101.6 μm) and a width of 10 cm. Subsequently, the solvent was dried to cure the resin, so that a resin film as resin molding was obtained.

3. Evaluation Method of Ferrite Particle

The obtained ferrite particles in Examples 1 and 2 and Comparative Examples 1 to 5 were subjected to chemical analysis in conjunction with evaluation on powder properties (crystal form, particle shape, average particle diameter, BET specific surface area, and element segregated in surface), magnetic properties (saturation magnetisation and residual magnetisation), and electrical properties (volume resistivity). The methods for examining the properties are as follows. The results are shown in Table 2. The volume resistivity shows values at applied voltages of 200 V and 1000 V.

(Chemical Analysis)

The content of metal components in ferrite particles was examined as described below. First, weighed 0.2 g of ferrite particles were completely dissolved in a 60 ml of pure water with addition of 20 ml of 1N hydrochloric acid and 20 ml of 1N nitric acid by heating to prepare an aqueous solution. The obtained aqueous solution was set in an ICP analyzer (ICPS-1000IV manufactured by Shimadzu Corporation) to examine the content of metal components in the ferrite particles. Incidentally, a notation "<0.01" in Table 2 means an examination error or presence of inevitable impurities derived from raw materials, manufacturing processes or the like.

(Crystal Form)

Figure 1:
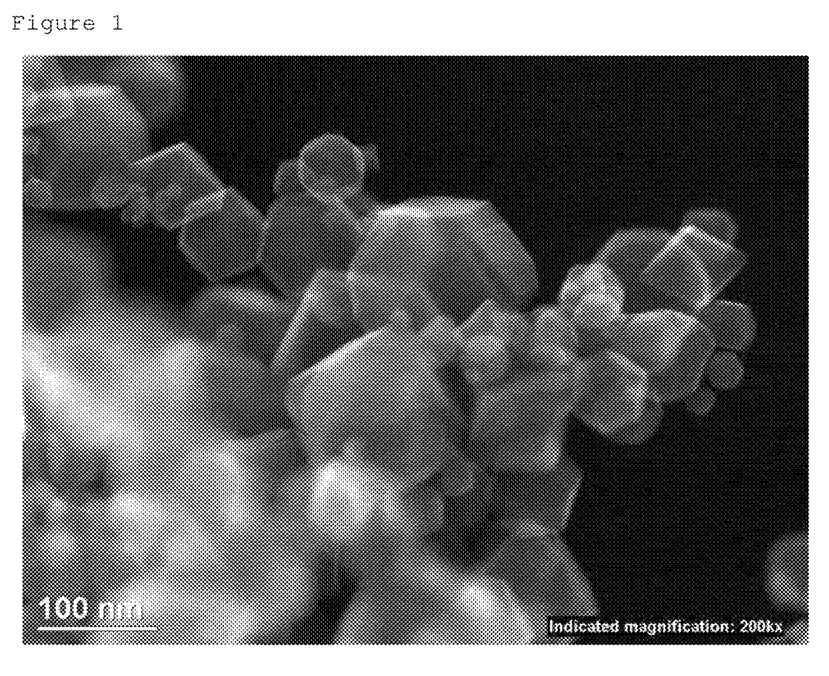
FIG. 1 is a photograph, showing a secondary electron image (magnification: 200000) in STEM observation of the ferrite particles in Example 1.

The crystal form of ferrite particles was observed by a scanning transmission electron microscope HD-2700 Cs-corrected STEM (manufactured by Hitachi High-Technologies Corporation) with an accelerating voltage of 200 kV. In FIG. 1, the photograph of a secondary electron image (magnification: 200000) in STEM observation of the ferrite particles in Example 1 is shown.

(Particle Shape)

Figure 2:
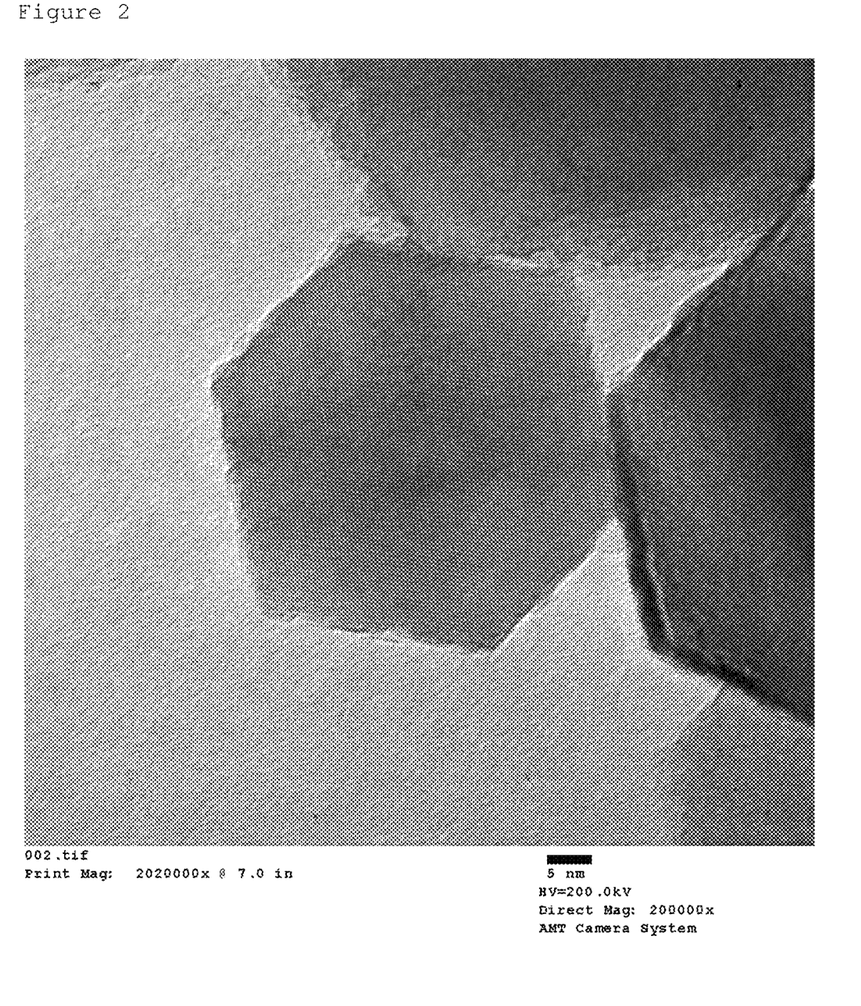
FIG. 2 is a photograph, showing a TEM image (magnification: 200000) of the ferrite particles in Example 1.

The shape of ferrite particles was observed by a scanning electron microscope HF-2100 Cold-FE-TEM (manufactured by Hitachi High-Technologies Corporation) with an accelerating voltage of 200 kV. In FIG. 2, the photograph of a TEM image (magnification: 200000) of ferrite particles in Example 1 is shown.

(Average Particle Diameter)

The horizontal Feret diameter was used as the average particle diameter of ferrite particles in Examples 1 and 2 and Comparative Examples 2 and 3. The volume average particle diameter was used as the average particle diameter of ferrite particles in Comparative Examples 1, 4 and 5.

(Horizontal Feret Diameter)

The obtained ferrite particles were photographed by a scanning electron microscope FE-SEM (SU-8020 manufactured by Hitachi High-Technologies Corporation) with a magnification of 200000. On this occasion, 100 or more of the ferrite particles countable in the visual field were photographed. The photographed SEM image was subjected to image analysis by using an image analysis software (Image-Pro PLUS, produced by Media Cybernetics. Inc.). The horizontal Feret diameter of each of the particles in the obtained image was manually examined to obtain the average particle diameter.

(Volume Average Particle Diameter)

Together with 80 mL of water as dispersion medium, 10 g of the obtained ferrite particles were put in a beaker, and a few drops of sodium hexametaphosphate aqueous solution as a dispersant were added. Subsequently, the ferrite particles were dispersed in the solution by oscillation of an ultrasonic homogenizer (UH-150 manufactured by SMT Co., Ltd.) at an output level of 4 for 20 seconds. Subsequently, after removal of the foam generated on the surface of the beaker, solid-liquid separation was performed to collect the ferrite particles. The volume average particle diameter of the collected ferrite particles was examined by a Microtrac particle size analyzer manufactured by Nikkiso Co., Ltd. (Model 9320-X100).

(BET Specific Surface Area)

The BET specific surface area was examined by using an apparatus for examining specific surface area (Macsorb HM model-1208, manufactured by Mountech Co., Ltd.). First, about 10 g of the obtained ferrite particles were placed on a medicine paper, and heated at 200° C. for 2 hours after confirmation of the vacuum degree reaching −0.1 MPa or lower through deaeration by a vacuum dryer, so that the moisture adhering to the surface of the ferrite particles was removed. Subsequently, about 0.5 to 4 g of the ferrite particles with moisture removed was placed in a standard sample cell dedicated to the apparatus so as to be accurately weighed by a precision balance. Subsequently, the weighed ferrite particles were set in an examination port of the apparatus so as to be examined. The examination was performed by a one-point method. The atmosphere for the examination was at a temperature of 10 to 30° C. and a relative humidity of 20 to 80% (without dew condensation).

(Element Segregated in Surface)

Figure 3:
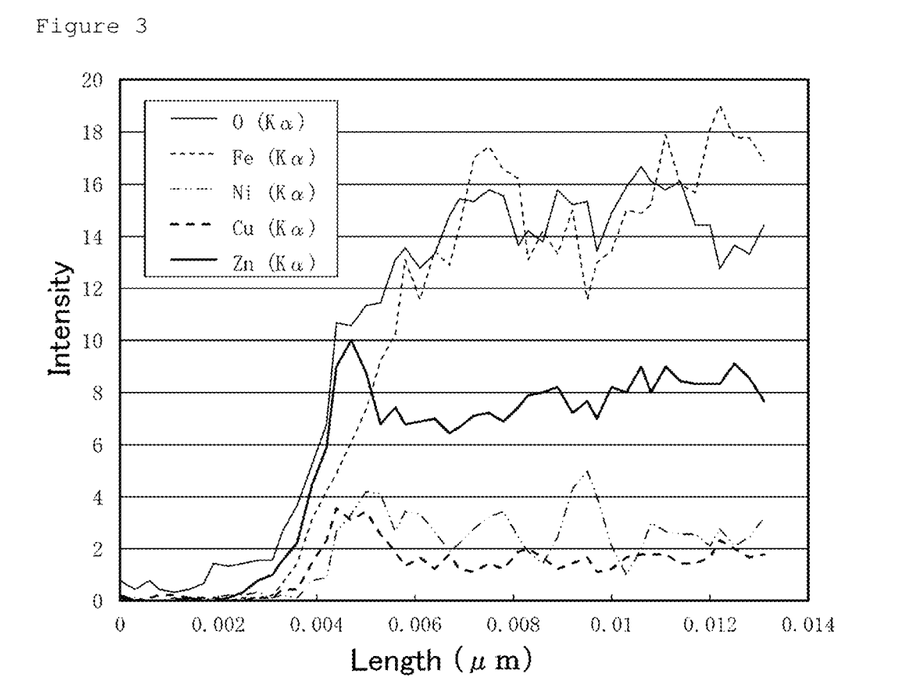
FIG. 3 is a graph, showing EDX analysis results of the ferrite particles in Example 1.

The image of the ferrite particles observed by the scanning transmission electron microscope described above (STEM image) was subjected to energy dispersive X-ray analysis (EDX). In the analysis, EDAX Octane T Ultra W (manufactured by Ametek Inc.) was used. In FIG. 3, the EDX analysis results of the ferrite particles in Example 1 are shown.

(Magnetic Properties)

The magnetic properties were examined by a vibrating sample magnetometer (VSM-C7-10A, manufactured by Toei Industry Co., Ltd.). First, a cell having an inner diameter of 5 mm and a height of 2 mm was filled with the obtained ferrite particles, and set in the apparatus described above. In the apparatus, a magnetic field was applied and swept to 5K·1000/4π·A/m. Subsequently, the applied magnetic field was reduced, so that a hysteresis curve was made on a recording paper. In the curve, a magnetisation in response to an applied magnetisation of 5K·1000/4π·A/m was regarded as the saturation magnetisation, and a magnetisation in response to an applied magnetisation of 0K·1000/4π·A/m was regarded as the residual magnetisation.

(Powder Resistivity)

The powder resistivity was examined in the following manner. First, after a cylinder made of fluorine-contained resin with a cross section of 4 $cm^2$ was filled with a sample (ferrite particles) to a height of 4 mm, electrodes were mounted to both ends thereof, and a 1 kg weight was placed thereon. Subsequently, using an insulation resistivity tester 6517A manufactured by Keithley Instruments, an examination voltage (200 V and 1000 V) was applied to the electrodes to examine the electrical resistivity after 60 seconds for calculation of the volume resistivity.

(Magnetic permeability)

Figure 4:
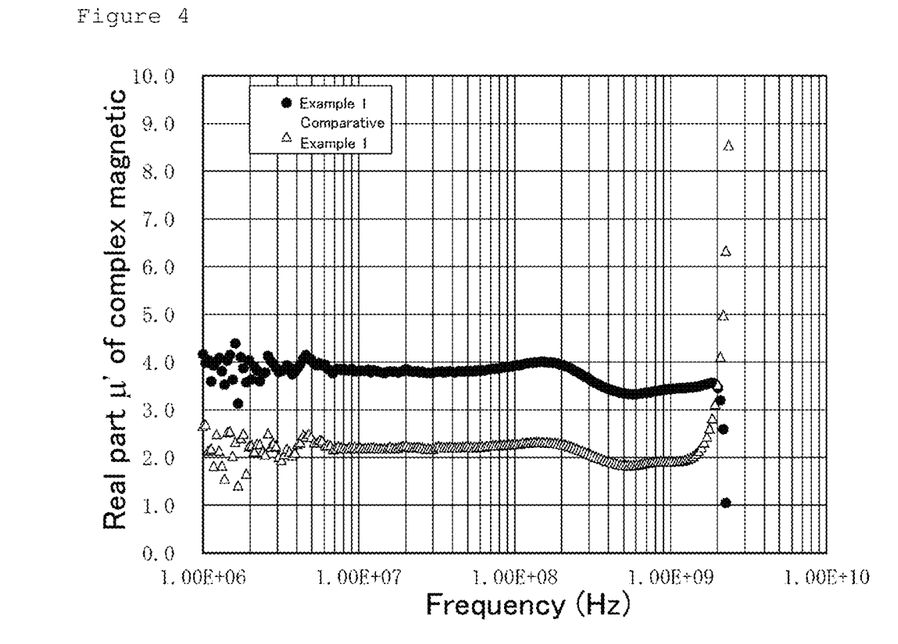
FIG. 4 is a graph, showing the frequency dependence of the real part μ' of complex magnetic permeability of the ferrite particles in Example 1 and Comparative Example 1.

The magnetic permeability was examined by using an RF impedance/material analyzer E4991A with electrodes for examining magnetic material 16454A, manufactured by Agilent Technologies, Inc. First, 9 g of ferrite particles and 1 g of a binder resin (Kynar 301F: polyvinylidene fluoride) were accommodated in a 100-cc polyethylene container and stirred and mixed by a ball mill at 100 rpm for 30 minutes. After completion of stirring, about 0.6 g of the mixture was packed into a die with an inner diameter of 4.5 mm and an outer diameter of 13 mm so as to be compressed under a pressure of 40 MPa for 1 minute with a pressing machine. The obtained molding was thermally cured at 140° C. for 2 hours by a hot air dryer to obtain a sample to be examined. The sample to be examined was set in the examination apparatus, and, the pre-examined outer diameter, inner diameter and height of the sample to be examined were inputted to the examination apparatus. In the examination, the amplitude was set at 100 mV, and the sweeping was performed in the frequency range from 1 MHz to 3 GHz in a logarithmic scale to examine the real part IA' of complex magnetic permeability. Note that the permeability was not able to be examined in the frequency band higher than 2 GHz due to the large influence of an examination jig. The obtained graph is shown in FIG. 4.

TABLE 2

| | Chemical analysis (ICP) (wt %) | | | | | | | | | Average particle diameter (nm) |
|---|---|---|---|---|---|---|---|---|---|---|
| | Fe | Ni | Zn | Cu | Mn | Mg | Sr | Shape | Crystal form | |
| Example 1 | 41.7 | 8.2 | 18.2 | 2.7 | 0.6 | <0.1 | <0.1 | Polyhedral | Single crystal | 193 |
| Example 2 | 29.2 | 8.3 | 26.7 | 5.0 | 1.6 | <0.1 | 0.1 | Polyhedral | Single crystal | 242 |
| Comparative Example 1 | 11.7 | 6.5 | 51.4 | 7.6 | 0.1 | <0.1 | <0.1 | Polyhedral | Single crystal | 242 |
| Comparative Example 2 | 44.6 | 5.0 | 15.8 | 3.4 | 0.1 | <0.1 | <0.1 | Polyhedral | Polycrystal | 33230 |
| Comparative Example 3 | 62.3 | 3.4 | 2.5 | 0.7 | 0.7 | <0.1 | <0.1 | Polyhedral | Mixture of single crystal and polycrystal | 10340 |
| Comparative Example 4 | 62.1 | <0.1 | <0.1 | <0.1 | 8.2 | <0.1 | <0.1 | Spherical | Single crystal | 186 |
| Comparative Example 5 | 49.0 | <0.1 | <0.1 | <0.1 | 19.3 | 2.1 | 1.0 | Spherical | Single crystal | 96 |

Powder properties/Magnetic properties/Electrical properties

TABLE 2-continued

| | Powder properties/Magnetic properties/Electrical properties | | | | |
|---|---|---|---|---|---|
| | BET specific surface area (m²/g) | Saturation magnetisation *1 (Am²/kg) | Residual magnetisation *2 (Am²/kg) | Volume resistivity @ 200 V (Ω · cm) | Volume resistivity @ 1000 V (Ω · cm) |
| Example 1 | 12.61 | 50.2 | 4.2 | 1.32E+07 | 2.13E+07 |
| Example 2 | 9.56 | 20.8 | 2.2 | 1.05E+07 | 2.25E+07 |
| Comparative Example 1 | 9.01 | 2.0 | 0.3 | 8.19E+06 | 2.43E+07 |
| Comparative Example 2 | 0.10 | 62.6 | 1.9 | 2.66E+08 | 3.14E+08 |
| Comparative Example 3 | 0.30 | 66.9 | 3.2 | 3.23E+07 | 2.17E+07 |
| Comparative Example 4 | 10.33 | 75.9 | 8.9 | 7.57E+06 | 1.31E+07 |
| Comparative Example 5 | 29.10 | 50.3 | 11.5 | 1.01E+07 | 8.72E+06 |

*1: Magnetisation at 5K · 1000/4π · A/m
*2: Magnetisation at 0K · 1000/4π · A/m

4. Method for Evaluating Ink for Forming Coating Film and Resin molding

The inks for forming a coating film from ferrite particles obtained in Examples 1 and 2 and Comparative Examples 1 to 5, and resin moldings made from the inks for forming a coating film were evaluated as follows. The results are shown in Table 3.

(Dispersibility)

Based on the time required for the ink for forming a coating film made from ferrite particles obtained in Examples 1 and 2 and Comparative Examples 1 to 5 to be uniformly dispersed during stirring, the dispersibility of the ferrite particles in a resin composition was evaluated. Each of the symbols in Table 3 means as follows. Note that the determination of whether uniform dispersion was achieved or not was performed by visual observation.

○: Stirring time required for uniform dispersion was less than 5 minutes.

Δ: Stirring time required for uniform dispersion was 5 minutes or more and less than 30 minutes.

x: Stirring time required for uniform dispersion was 30 minutes or more.

(Surface Smoothness)

The film thickness of the resin molding made from the ink for forming a coating film was examined by a micrometer. Examination was performed 9 times at different locations. The difference between the maximum film thickness and the minimum film thickness (maximum film thickness-minimum film thickness) was calculated, and the surface smoothness of a resin molding was evaluated from the difference. Each of the symbols in Table 3 means as follows.

○: (maximum film thickness-minimum film thickness) ≤10 μm

Δ: 10 μm<(maximum film thickness-minimum film thickness)<20 μm x: 20 μm≤(maximum film thickness-minimum film thickness)

TABLE 3

| | Ink for forming coating film | | Resin molding | |
|---|---|---|---|---|
| | Resin | Dispersibility | Substrate | Surface smoothness |
| Example 1 | Epoxy | ○ | PET FILM | ○ |
| Example 2 | Epoxy | ○ | PET FILM | ○ |
| Comparative Example 1 | Epoxy | ○ | PET FILM | ○ |
| Comparative Example 2 | Epoxy | x | PET FILM | Unevaluable |
| Comparative Example 3 | Epoxy | x | PET FILM | x |
| Comparative Example 4 | Epoxy | Δ | PET FILM | ○ |
| Comparative Example 5 | Epoxy | x | PET FILM | ○ |

5. Evaluation Result on Ferrite Particle

As shown in FIG. 1, it is apparent that the ferrite particles in Example 1 had a polyhedral particle shape. As shown in FIG. 2, no crystal grain boundaries are observed in the internal part of the ferrite particles in Example 1, and it is, therefore, apparent that the ferrite particles in Example 1 are in a single crystalline body. As shown in Table 1, the average particle diameter of the ferrite particles in Example 1 was in the range from 1 to 2000 nm. The ferrite particles in Example 2 had the same results as with the ferrite particles in Example 1.

As shown in Table 2, the ferrite particles in Examples 1 and 2 included metal components composed of Fe, Ni, Zn and Cu, with a Ni content in the range of 5 to 10 wt %, a Zn content in the range of 15 to 30 wt %, a Cu content in the range of 1 to 5 wt %, and an Fe content in the range of 25 to 45 wt %. It is conceivable that Mn and Sr contained in the ferrite particles in Examples 1 and 2 are inevitable impurities derived from the raw material, manufacturing processes, or the like. Incidentally, metal components other than the metals described above were present at a level below the detection limit, in the ferrite particles in Examples 1 and 2.

Also, the ferrite particles in Examples 1 and 2 had a saturation magnetisation of 20 Am²/kg or more, a residual magnetisation of 5 Am²/kg or less, and a volume resistivity at applied voltages of 200 V and 1000 V of 1×10⁷ Ω·cm or more. It is therefore apparent that the ferrite particles in Examples 1 and 2 can achieve a high saturation magnetisation and a high electrical resistivity in a stable state over the range from a low applied voltage to a high applied voltage, in addition to a low residual magnetisation.

FIG. 3 is a graph, showing EDX analysis results of ferrite particles in Example 1. The migration length (unit: μm) of the electron beam swept from the outer surface of the particle to the internal part is shown along the horizontal axis, and the intensities of oxygen, iron, nickel, copper and zinc were shown along the vertical axis. Since each of the lines rises near 0.004 μm on the horizontal axis, it is conceivable that the surface of the ferrite particle corresponds to near 0.004 μm on the horizontal axis. As shown in FIG. 3, the line representing Zn has the maximum of the intensity in the range from 0.004 to 0.006 μm on the horizontal axis, with decline in the intensity at 0.006 μm or more. From the results, it is apparent that the zinc content in the outer surface of the ferrite particle is larger than that in the internal part, and zinc is segregated in a region from the outer surface to a depth of 0.002 μm of the ferrite particle. Also, the line representing copper has the maximum of the intensity in the range from 0.004 to 0.006 μm on the horizontal axis, with decline in the intensity at 0.006 μm or more. From the results, it is apparent that the copper content in the outer surface of the ferrite particle is larger than that in the internal part, and copper is segregated in a region from the outer surface to a depth of 0.002 μm of the ferrite particle. The ferrite particles in Example 2 also had the same results as in FIG. 3.

Meanwhile, it was confirmed that the ferrite particles in Comparative Example 1 are in a single crystalline body having an average particle diameter of 1 to 2000 nm and having a polyhedral particle shape, as with the ferrite particles in Examples 1 and 2. Also, the ferrite particles in Comparative Example 1 had a lower saturation magnetisation and lower volume resistivity at an applied voltage of 200 V, in comparison with the ferrite particles in Examples 1 and 2. The cause is assumed to be the smaller iron content and the larger zinc content in Comparative Example 1 in comparison with those in Examples 1 and 2.

It was confirmed that although having a polyhedral particle shape, the ferrite particles in Comparative Example 2 are in a polycrystalline body having a large average particle diameter 0.24 μm, which is different from the ferrite particles in Examples 1 and 2. The conceivable reason is that firing in an electric furnace was performed in Comparative Example 2.

The ferrite particles in Comparative Example 3 are a mixture composed of particles in a single crystalline body and particles in a polycrystalline body, having a larger average particle diameter in comparison with the ferrite particles in Examples 1 and 2. The conceivable reason for the large average particle diameter is that all of the thermally sprayed and cooled ferrite particles were collected in Comparative Example 3, and even particles having a large particle diameter were therefore included.

Although the ferrite particles in Comparative Example 4 being Mn ferrite particles were in a single crystalline body having an average particle diameter of 1 to 2000 nm as with the ferrite particles in Examples 1 and 2, the particle shape was spherical. Also, the ferrite particles in Comparative Example 4 had a higher residual magnetisation and a lower volume resistivity at applied voltages of 200 V and 1000 V in comparison with the ferrite particles in Examples 1 and 2.

Although the ferrite particles in Comparative Example 5 being Mn—Mg ferrite particles were in a single crystalline body having an average particle diameter of 1 to 2000 nm as with the ferrite particles in Examples 1 and 2, the particle shape was spherical. Also, the ferrite particles in Comparative Example 5 had a higher residual magnetisation and a lower volume resistivity at an applied voltage of 1000 V in comparison with the ferrite particles in Examples 1 and 2.

In FIG. 4, a graph showing the frequency dependence of the real part μ' of complex magnetic permeability of each of the ferrite particles in Example 1 and Comparative Example 1. From FIG. 4, it is apparent that although the ferrite particles in Example 1 have a low value of the real part μ' of complex magnetic permeability, an approximately constant value is shown in a frequency band of 1 MHz to 2 GHz due to small frequency-dependent fluctuations. Meanwhile, it is apparent that although the ferrite particles in Comparative Example 1 have a small frequency-dependent fluctuations as with the ferrite particles in Example 1, the value of the real part μ' of complex magnetic permeability is lower than that of Example 1.

6. Evaluation Results of Ink for Forming Coating Film and Resin Molding

As shown in Table 3, the ferrite particles in Examples 1 and 2 had excellent dispersibility in a resin composition. It is therefore conceivable that an excellent productivity can be secured in manufacturing a resin molding from the ferrite particles in Example 1 or 2. It is conceivable that the excellent dispersibility of the ferrite particles in Examples 1 and 2 is due to the small average particle diameter and the low residual magnetisation. Also, from the ink for forming a coating film containing the ferrite particles in Example 1 or 2, a resin molding excellent in the surface smoothness with small surface irregularities was able to be formed.

Meanwhile, the ferrite particles in Comparative Examples 2 and 3 had low dispersibility in a resin composition due to a large average particle diameter, so that a long time was required for dispersion of the particles. Also, the ink for forming a coating film containing the ferrite particles in Comparative Example 2 failed to make a coating film, so that no resin molding was able to be formed. The resin molding made from the ink for forming a coating film containing the ferrite particles in Comparative Example 3 had a distorted surface with large irregularities.

The ferrite particles in Comparative Examples 4 and 5 were easily aggregated with each other due to a high residual magnetisation, so that a long time was required for dispersion. From the ink for forming a coating film containing the ferrite particles in Comparative Example 4 or 5, a resin molding excellent in the surface smoothness with small surface irregularities was able to be formed. However, a long time is required to prepare the ink for forming a coating film from the ferrite particles in Comparative Example 4 or 5, so that a low productivity in manufacturing a resin molding is presumed.

From the results described above, it is apparent that the ferrite particles in Examples 1 and 2 have both of a high saturation magnetisation and a high electrical resistivity together with a high dispersibility in a resin composition. And it is apparent that the ferrite particles in Example 1 and 2 allow a resin molding made from the particles to have excellent surface smoothness.

INDUSTRIAL APPLICABILITY

The ferrite particles of the present invention are suitable as magnet filler and raw material of a molding, having both of a high saturation magnetisation and a high electrical resistivity. Also, the ferrite particles can achieve excellent dispersibility in a resin, a solvent, or a resin composition, due to having a small average particle diameter and a low residual magnetisation. As a result, when a resin composition containing the ferrite particles as filler is prepared and a molding such as a resin film composed of the resin composition is formed, the ferrite particles allow the molding to have a smooth surface without aggregation of the ferrite particles in the surface, with a high productivity.

Also, by using the resin composition containing the ferrite particles as filler or the resin molding composed of the resin composition as a flexible printed wiring material for use in wiring and cables to electronic equipment, the resin molding no longer needed in forming a metal wiring can be adsorbed to remove with a magnetic field, so that the metal wiring can be formed in a simple and efficient manner. The obtained flexible wiring material contains the ferrite particles which achieve a high electrical resistivity over the range from low applied voltage to high applied voltage in a stable state, so that the generation of electric current leakage can be prevented to secure the durability.

The invention claimed is:

1. A Ni-Zn-Cu ferrite particle in a single crystalline body having an average particle diameter of 1 to 2000 nm, having a polyhedral particle shape, comprising 5 to 10 wt % of Ni, 15 to 30 wt % of Zn, 1 to 5 wt % of Cu, and 25 to 50 wt % of Fe.

2. A Ni-Zn-Cu ferrite particle in a single crystalline body having an average particle diameter of 1 to 2000 nm, having a polyhedral particle shape, comprising 5 to 10 wt % of Ni, 15 to 30 wt % of Zn, 1 to 5 wt % of Cu and 25 to 50 wt % of Fe;
   wherein at least a portion of the Zn is segregated in the surface of the Ni-Zn-Cu ferrite particle as a ZN oxide.

3. The Ni-Zn-Cu ferrite particle according to claim 2, wherein at least a portion of the Cu is segregated in the surface of the Ni-Zn-Cu ferrite particle as a Cu oxide.

4. The Ni-Zn-Cu ferrite particle of claim 2, wherein a content of Zn has a peak in a region from the surface of the ferrite particles to a depth of 0.002 p.m.

5. A Ni-Zn-Cu ferrite particle in a single crystalline body having an average particle diameter of 1 to 2000 nm, having a polyhedral particle shape, comprising 5 to 10 wt % of Ni, 15 to 30 wt % of Zn, 1 to 5 wt % of Cu, and 25 to 50 wt % of Fe;
   wherein at least a portion of the Cu is segregated in the surface of the Ni-Zn-Cu ferrite particle as a Cu oxide.

6. The Ni-Zn-Cu ferrite particle of claim 5, wherein a content of Cu has a peak in a region from the surface of the ferrite particles to a depth of 0.002 p.m.

7. A resin composition comprising the Ni-Zn-Cu ferrite particle according to claim 1 as filler.

8. A resin molding comprising the resin composition according to claim 7.

9. A resin composition comprising the Ni-Zn-Cu ferrite particle according to claim 2 as filler.

10. A resin molding comprising the resin composition according to claim 9.

11. A resin composition comprising the Ni-Zn-Cu ferrite particle according to claim 5 as filler.

12. A resin molding comprising the resin composition according to claim 11.

13. A resin composition comprising the Ni-Zn-Cu ferrite particle according to claim 3 as filler.

14. A resin molding comprising the resin composition according to claim 13.

* * * * *